US012704139B2

(12) United States Patent
Walker

(10) Patent No.: US 12,704,139 B2
(45) Date of Patent: Aug. 11, 2026

(54) FIXING OF PET PANELS TO ALLOW FOR RECYCLING

(71) Applicant: AUTEX INDUSTRIES LIMITED, Auckland (NZ)

(72) Inventor: Luke Clifford Walker, Auckland (NZ)

(73) Assignee: AUTEX INDUSTRIES LIMITED, Auckland (NZ)

(*) Notice: Subject to any disclaimer, the term of this patent is extended or adjusted under 35 U.S.C. 154(b) by 0 days.

(21) Appl. No.: 18/979,293

(22) Filed: Dec. 12, 2024

(65) Prior Publication Data

US 2025/0198438 A1 Jun. 19, 2025

(30) Foreign Application Priority Data

Dec. 15, 2023 (NZ) ........................................ 806637

(51) Int. Cl.

| | |
|---|---|
| ***B29C 65/00*** | (2006.01) |
| ***F16B 5/02*** | (2006.01) |
| *B29B 17/04* | (2006.01) |
| *B29C 65/06* | (2006.01) |
| *B29C 65/78* | (2006.01) |
| *B29K 67/00* | (2006.01) |
| *B29L 7/00* | (2006.01) |

(Continued)

(52) U.S. Cl.
CPC ........ *F16B 5/0208* (2013.01); *B29B 17/0412* (2013.01); *B29C 65/0672* (2013.01); *B29K 2067/003* (2013.01); *B29L 2031/776* (2013.01)

(58) Field of Classification Search
CPC .............. E04F 13/0803; E04F 13/0812; E04F 13/0816; E04F 13/0835; E04F 13/0862; E04F 13/0885; F16B 5/0208; F16B 5/07
USPC ........................................................... 52/511
See application file for complete search history.

(56) References Cited

U.S. PATENT DOCUMENTS 527,094 A * 10/1894 Whiteley ................ E04F 15/10 52/177
1,668,469 A * 5/1928 Sackett ............... E04F 13/0835 52/285.3

(Continued)

FOREIGN PATENT DOCUMENTS

CN 2064590 U * 10/1990
DE 102013002407 B3 * 6/2014 ............. B29B 17/02

(Continued)

*Primary Examiner* — Brian D Mattei
*Assistant Examiner* — Joseph J. Sadlon
(74) *Attorney, Agent, or Firm* — NIXON & VANDERHYE

(57) ABSTRACT

A method of recycling/upcycling needle punched PET panels or baffles makes use of a plurality of injection moulded PET components capable of being attached to a needle punched PET panel by plastic welding and to be removably attachable to complementary components fixed or fixable to a support. Spin welding allows the injection moulded PET components to be installed on site or in the factory. The PET panel with its now welded PET components can be press fitted to the complementary components fixed on the wall. A modified form of PET fixing component allows for a suspended baffle or panel. The PET panel or baffle with its PET components welded thereto can be recycled/upcycled without needing to remove the PET components from the panel as they are uncontaminated by any adhesive.

17 Claims, 13 Drawing Sheets

(51) Int. Cl.
*B29L 31/00* (2006.01)
*F16B 5/07* (2006.01)

(56) References Cited

U.S. PATENT DOCUMENTS 1,854,772 A * 4/1932 Stuken ................ E04F 13/0816 52/773
2,053,412 A * 9/1936 Aberson ............. E04F 13/0862 52/387
2,100,635 A * 11/1937 De Vries ............. E04F 13/0835 24/621
2,298,743 A * 10/1942 Lichtor ................. E04B 1/2403 52/287.1
2,938,376 A * 5/1960 Workman ........... E04F 13/0862 52/391
3,162,279 A * 12/1964 Leininger .............. B29C 70/68 156/92
3,248,838 A * 5/1966 Stark .................. E04F 13/0819 52/489.2
3,305,995 A * 2/1967 Jackson .................... F16B 5/02 52/573.1
3,434,262 A * 3/1969 Lawrence ................ F16B 5/01 52/801.12
3,507,315 A * 4/1970 Tummarello ......... E04B 1/4107 411/965
3,652,360 A * 3/1972 Hartman .................. C08L 9/02 156/244.11
3,742,673 A * 7/1973 Jennings ................... F16B 5/01 52/801.1
3,771,275 A * 11/1973 Seckerson .............. F16B 5/065 403/388
3,851,357 A * 12/1974 Ribich .................. B29C 65/069 248/222.12
3,991,534 A * 11/1976 Brumlik .................... E04B 1/49 24/442
4,033,083 A * 7/1977 Fritz ........................ E04B 9/24 52/489.1
4,095,385 A * 6/1978 Brugman ............ E04F 13/0814 52/762
4,122,583 A * 10/1978 Grittner .............. F16B 19/1081 411/509
4,123,886 A * 11/1978 Byrd, Jr. ............... F27D 1/0013 373/137
4,139,975 A * 2/1979 Baker ...................... F16B 5/00 432/247
4,144,110 A * 3/1979 Luc ........................... C09J 5/02 428/409
4,226,068 A * 10/1980 Wadsworth ......... E04F 13/0871 403/379.5
4,462,194 A * 7/1984 Wahner ................... B32B 15/20 411/510
4,568,215 A * 2/1986 Nelson .................. B29C 66/474 24/297
4,592,187 A * 6/1986 Crites ................. E04F 13/0733 52/261
4,597,235 A * 7/1986 Olsen .................. E04F 13/0803 52/762
4,635,424 A * 1/1987 Drapeau ............. E04F 13/0812 52/510
4,680,913 A * 7/1987 Geisen ...................... E04B 1/66 52/746.1
4,726,164 A * 2/1988 Reinwall ............... E04D 3/3603 411/533
4,778,551 A * 10/1988 Coffman ............... B29C 43/003 264/153
4,793,112 A * 12/1988 Sufke ................ B32B 17/10293 52/309.14
4,885,887 A * 12/1989 Simmons ................ E04D 5/147 52/459
4,907,384 A * 3/1990 Underwood .......... E04B 2/7425 52/126.6
4,987,714 A * 1/1991 Lemke ................ F16B 19/1081 52/410
5,054,256 A * 10/1991 Glover ................ E04F 13/0803 52/765
5,118,235 A * 6/1992 Dill ....................... E04D 3/3603 411/908
5,193,958 A * 3/1993 Day ......................... B05D 5/08 411/914
5,204,148 A * 4/1993 Alexander ............. E04D 5/145 52/514
5,228,937 A * 7/1993 Passeno .............. E04F 13/0801 52/387
5,237,945 A * 8/1993 White ....................... B09B 1/00 156/308.2
5,257,490 A * 11/1993 Endo .................. E04F 13/0835 52/746.1
5,280,690 A * 1/1994 Hu ...................... E04F 13/0855 52/511
5,300,178 A * 4/1994 Nelson ................ B29C 63/0082 181/290
5,389,166 A * 2/1995 White ..................... E02B 3/122 442/13
5,390,468 A * 2/1995 Probst ................... E04F 13/144 428/116
5,412,912 A * 5/1995 Alves .................... A47F 5/0846 52/36.5
5,426,905 A * 6/1995 Rollhauser ............. F16B 35/00 52/410
5,433,043 A * 7/1995 Hibbitt ................ E04F 13/0832 52/27
5,531,535 A * 7/1996 Lind ....................... F16B 13/08 403/231
5,537,793 A * 7/1996 Murasaki .................. F16B 5/07 D8/382
5,644,885 A * 7/1997 Eischeid ............... E04G 21/185 248/221.11
5,718,547 A * 2/1998 Eischeid ............... F16B 13/126 411/48
5,749,669 A * 5/1998 Ketteler .................... F16B 5/02 52/506.05
5,776,582 A * 7/1998 Needham ............. E04B 1/6179 428/116
5,778,621 A * 7/1998 Randjelovic ............ E04F 15/22 52/480
5,800,891 A * 9/1998 Wasitis ................... E04D 5/145 428/40.1
5,902,657 A * 5/1999 Hanson ............ B29C 66/52431 52/656.2
5,931,729 A * 8/1999 Penttila ............... B29C 66/8242 451/508
5,996,299 A * 12/1999 Hsueh ................... E04B 2/7863 52/656.1
6,065,894 A * 5/2000 Wasson ................... E01F 9/635 404/6
6,158,178 A * 12/2000 Jeffers ................... E04B 2/7437 52/505
6,199,328 B1 * 3/2001 McGrath ............... F16B 5/0642 52/584.1
6,237,294 B1 * 5/2001 Rygiel .................... B29C 70/30 264/220
6,464,438 B1 * 10/2002 Dowling ............... F16B 41/002 411/372.6
6,703,129 B1 * 3/2004 Kakehi ................. B29C 66/112 428/409
6,857,241 B1 * 2/2005 Pellicer ................... B28B 19/00 405/259.1
6,918,212 B1 * 7/2005 Anderson, Sr. ....... E04B 1/7675 52/311.1
6,964,137 B2 * 11/2005 Frascari .............. E04F 13/0819 52/390
7,326,017 B2 * 2/2008 Winker ................... F16B 43/00 411/533
7,407,688 B2 * 8/2008 Kamite ..................... B29B 7/92 427/322
7,465,484 B2 * 12/2008 Handwerker ............. B32B 3/12 428/72
7,562,504 B2 * 7/2009 Herbst ................ E04F 13/0889 52/762

(56) References Cited

U.S. PATENT DOCUMENTS 7,582,178 B2 * 9/2009 Hughes ............. A61F 13/15585 156/244.11
7,641,962 B2 * 1/2010 Sutton ....................... E04C 2/20 428/221
7,810,295 B2 * 10/2010 Thompson ................ E04H 9/14 49/63
7,895,803 B2 * 3/2011 Downey ................. F16F 1/373 248/610
8,129,011 B2 * 3/2012 Laue ..................... B29C 66/344 428/57
8,132,389 B2 * 3/2012 Gee ....................... B28B 23/005 52/745.1
8,349,245 B2 * 1/2013 Ishida ..................... B29C 49/04 264/516
8,397,457 B2 * 3/2013 Hauser ................ E04G 23/0218 52/351
8,413,398 B1 * 4/2013 Allred ..................... F16G 11/06 52/39
8,413,406 B2 * 4/2013 Jablonka ................. E04B 1/644 52/746.1
8,464,989 B2 * 6/2013 Busch ................ A47B 96/1458 248/345.1
8,562,769 B2 * 10/2013 Kraus ..................... E04D 5/144 52/309.5
8,579,080 B2 * 11/2013 Angelico .............. E01F 8/0076 181/290
8,628,049 B2 * 1/2014 Ghatikar ................... E04B 9/18 248/231.91
8,689,409 B2 * 4/2014 Hanley ............... E04F 13/0885 24/297
8,739,483 B1 * 6/2014 Bilge .................. E04F 13/0858 52/235
8,752,803 B2 * 6/2014 Goldberg ............... B43M 15/00 248/231.91
8,826,620 B2 * 9/2014 Krause ................ E04F 13/0875 52/489.1
8,875,467 B2 * 11/2014 Anastasi ............. E04F 13/0853 52/712
8,950,991 B2 * 2/2015 Trifilio .................. F16B 5/0208 411/103
8,955,289 B2 * 2/2015 Clinch .................... F16B 13/02 29/520
8,959,748 B2 * 2/2015 Olson ................... E04F 13/144 52/573.1
9,140,008 B2 * 9/2015 Beaty ........................ E04B 2/02
9,187,913 B2 * 11/2015 Sharpe .................. E04F 13/007
9,470,254 B2 * 10/2016 Burbach ............. E04F 13/0816
9,597,846 B2 * 3/2017 Petzel ................. B29C 35/0266
9,631,372 B1 * 4/2017 Bilge .................... E04F 13/072
9,670,669 B2 * 6/2017 Gosling .................. E04C 2/288
9,850,666 B2 * 12/2017 Libreiro .............. E04F 13/0816
9,889,637 B2 * 2/2018 Weinberg .................. B32B 7/12
9,895,750 B2 * 2/2018 Craig .................... B23B 49/026
10,022,903 B2 * 7/2018 Igarashi .................... B32B 3/12
10,145,122 B2 * 12/2018 Rodriguez Lopez . E04F 13/076
10,156,045 B2 * 12/2018 Penland ................ E04F 15/107
10,173,354 B2 * 1/2019 Mack ........................ B32B 5/30
10,344,786 B2 * 7/2019 Jodeleit .................. F16B 21/04
10,480,186 B2 * 11/2019 Tanguay ............... E04B 2/7401
10,550,580 B1 * 2/2020 Longo ....................... E04B 1/86
10,639,744 B2 * 5/2020 Chen ....................... B29C 66/71
10,676,918 B2 * 6/2020 Caruso .................... B32B 25/06
10,844,611 B2 * 11/2020 Franklin ................. E04F 13/12
10,850,440 B2 * 12/2020 Buckingham ........... B29C 41/32
10,865,570 B2 * 12/2020 Longo ................ E04F 13/0835
10,927,552 B2 * 2/2021 Crosier ............... E04F 13/0866
10,946,468 B2 * 3/2021 Erlacher ............. B29C 65/7841
10,961,705 B2 * 3/2021 Yu ........................... E04B 9/225
10,982,433 B2 * 4/2021 Buck ....................... E04B 9/045
11,021,868 B2 * 6/2021 Shin .................... E04F 13/0812
11,060,275 B2 * 7/2021 Kucera ................... E04F 13/14
11,333,190 B1 * 5/2022 Rice ...................... F16B 37/122
11,358,343 B2 * 6/2022 Mayer ..................... B29C 65/08
11,459,770 B1 * 10/2022 Gotfredson ......... E04F 13/0825
11,473,288 B2 * 10/2022 Kolisnek ................. E04C 2/292
11,499,309 B2 * 11/2022 De Faveri ........... E04F 13/0803
11,629,506 B1 * 4/2023 Ferguson ............ E04F 13/0891 52/489.1
11,788,821 B2 * 10/2023 Scarinci .................. B29C 65/02 89/36.02
12,115,483 B2 * 10/2024 Yano .................... B01D 46/543
12,195,978 B2 * 1/2025 Batten ..................... E04F 13/09
12,276,298 B2 * 4/2025 Gillis .................. F16B 25/0015
12,291,865 B2 * 5/2025 Lahti ..................... E04B 1/6133
12,331,510 B2 * 6/2025 Sherman ............. E04F 13/0875
12,467,263 B2 * 11/2025 Kuster ................ E04F 13/0835
2003/0029110 A1 * 2/2003 Pacione ............... A47G 27/025 52/311.2
2003/0152745 A1 * 8/2003 Wagenblast ...... B29C 66/52451 428/122
2005/0042023 A1 * 2/2005 Jones ...................... B29C 65/76 403/267
2006/0059825 A1 * 3/2006 Wiercinski ................. C09J 7/38 52/506.01
2007/0057136 A1 * 3/2007 Houlden ............ A47B 96/1416 248/339
2007/0107347 A1 * 5/2007 Haynes .............. E04D 13/1415 52/410
2008/0075556 A1 * 3/2008 Smith ................... F16B 5/0233 411/379
2008/0127586 A1 * 6/2008 Carolan .............. F16B 13/0833 52/584.1
2008/0148666 A1 * 6/2008 Degen ................ E04F 13/0837 52/506.1
2008/0178437 A1 * 7/2008 Lottini .................. E04F 13/088 24/586.11
2009/0056257 A1 * 3/2009 Mollinger ................. B44F 9/04 52/309.4
2010/0154806 A1 * 6/2010 Duffy ................. A41D 13/1115 156/227
2010/0199585 A1 * 8/2010 Stevens .............. E04F 13/0803 52/475.1
2011/0120623 A1 * 5/2011 Aceto ................... E04F 13/145 156/92
2011/0287248 A1 * 11/2011 Rakutt ............. B29C 66/73921 428/319.3
2012/0011795 A1 * 1/2012 Pacione ............ A47G 27/0475 156/289
2012/0055102 A1 * 3/2012 Fradera Pellicer ... E04B 1/4121 52/302.1
2013/0186027 A1 * 7/2013 Sharpe .................. E04F 13/007 52/582.1
2017/0021556 A1 * 1/2017 Rinklake ................. B29C 65/48
2018/0328051 A1 * 11/2018 Singh .................... E04F 19/066
2020/0115909 A1 * 4/2020 Longo ................. E04F 13/0882
2020/0291660 A1 * 9/2020 Ma ...................... E04F 13/0835
2021/0396006 A1 * 12/2021 Collins .................. E04B 1/625
2022/0341182 A1 * 10/2022 Napier ............... E04F 13/0816
2023/0226343 A1 * 7/2023 Saul .................... A61M 60/205 604/93.01
2023/0265662 A1 * 8/2023 Bafna .................. A47G 1/1606 52/489.1
2023/0294377 A1 * 9/2023 Rakutt .................. B32B 27/065 428/319.7
2023/0338672 A1 * 10/2023 Pawlak ................. A61M 5/145
2023/0404220 A1 * 12/2023 Voigt ................. A44B 18/0069
2024/0191513 A1 * 6/2024 Morini ................ E04F 13/0875
2024/0218596 A1 * 7/2024 Spencer .............. B29B 17/0412
2025/0003223 A1 * 1/2025 Torrejón Puchol .......................... E04F 13/0816
2025/0122730 A1 * 4/2025 Boucké ............... E04F 13/0894
2025/0223801 A1 * 7/2025 Lamdan ................ F16B 13/128
2025/0305293 A1 * 10/2025 Lamdan .............. E04F 13/0885

FOREIGN PATENT DOCUMENTS

DE 102014004306 A1 * 10/2015 ............ F16B 33/006
DE 102016009614 A1 * 2/2018 .......... E04F 13/0816
EP 0637355 B1 * 2/2004 .......... E04F 13/0835
EP 2385260 A1 * 11/2011 ............ F16B 41/002

(56) References Cited

FOREIGN PATENT DOCUMENTS

| | | | | | |
|---|---|---|---|---|---|
| EP | 3103608 | A1 | * | 12/2016 | ............. B29B 17/02 |
| ES | 2197989 | T3 | * | 1/2004 | ........... A61F 13/625 |
| GB | 2592920 | A | * | 9/2021 | ............... G21B 1/13 |
| JP | 3208575 | U | * | 1/2017 | .............. F16B 12/24 |
| NZ | 813893 | | | 8/2024 | |
| WO | WO-9010112 | A1 | * | 9/1990 | ......... A47G 27/0437 |
| WO | 20230146418 | | | 8/2023 | |

* cited by examiner

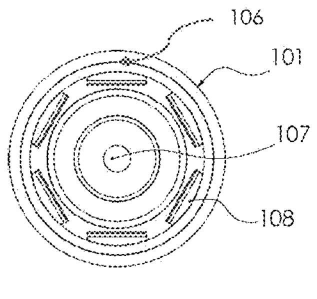
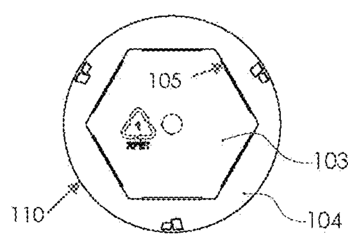
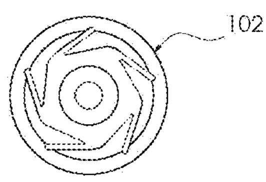
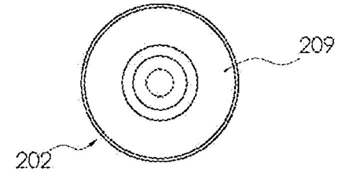
Fig 1
Fig 1a
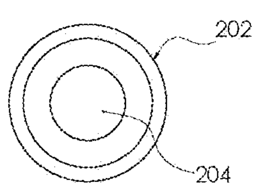
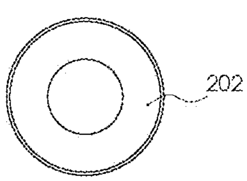
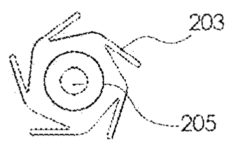
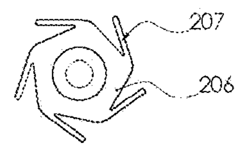
Fig 2
Fig 2a 101
107
410

101
410
411

401
410
412

101
414

502
501
101
106

107
401

505
506

507

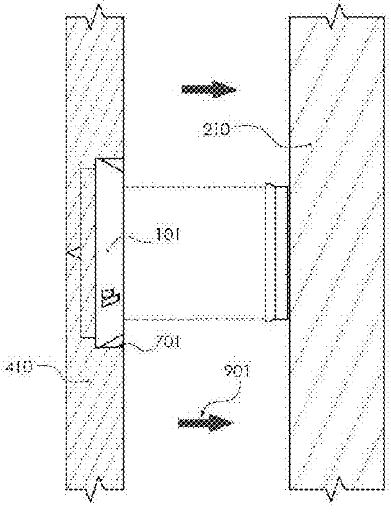
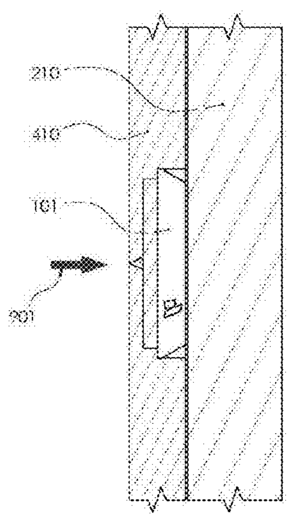
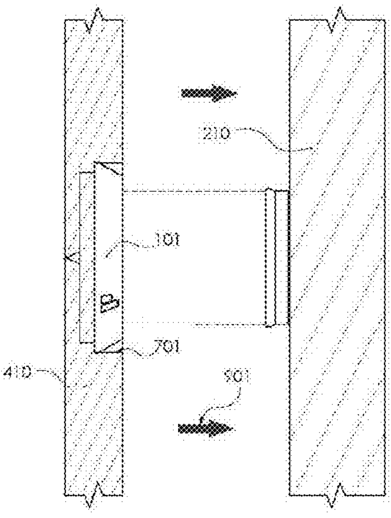
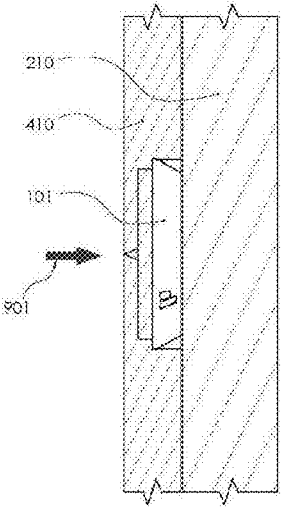
Fig 9a
Fig 9b

FIXING OF PET PANELS TO ALLOW FOR RECYCLING

CROSS-REFERENCE TO RELATED APPLICATION

This application claims priority to NZ 806637 filed in New Zealand on Dec. 15, 2023, the entire contents of which are hereby incorporated by reference.

FIELD OF THE INVENTION

The invention relates to a method fixing of needle punched PET products to a wall or other support to allow for recycling/upcycling or replacement, and also relates to the components to be used in this new method.

BACKGROUND OF INVENTION

This invention relates in particular to methods and/or components for the attachment of needle punched PET panels or baffles to a support such as a suspension system so that the panels or baffles can be suspended and held in a horizontal plane, or can be attached to walls or furniture where they will typically be held in a vertical plane. Needle punched PET panels can be decorative and provide good sound absorption properties.

Needle punched PET products can be produced in a variety of sizes, shapes, and thicknesses. We use the term “products” to imply a degree of rigidity or stiffness that is not present in needle punched fabrics. These needle punched products are used mainly for acoustic purposes but can also be used for decorative and in some cases for thermal insulation. They are typically produced as panels, tiles, suspended baffles, screens, or dividers between workstations.

PET is the common abbreviation for—poly ethylene terephthalate.

PET, unlike natural polymers, is a non-degradable polymer in the natural environment leading to environmental pollution when it is discarded after use. Consequently, it is desirable to recycle (sometimes called upcycle) it wherever possible.

However existing methods of attaching them to walls or furniture typically involves the use of an adhesive, so that removal of the panels, for example if one is damaged and needs to be replaced, or if the fit-out needs to be changed, often results in damage to the underlying support, e.g. a plasterboard wall, or parts of the furniture structure.

More importantly, the use of an adhesive to secure a PET panel to a support, renders the removed panel as unable to be recycled as the adhesive does not comply with standards relating to the recycling of PET material.

If fasteners such as screws are used, e.g. through the panels, then damage to the PET panel can occur rendering it unsightly, and requiring careful removal and separation from the panels prior to recycling.

PRIOR REFERENCES

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

OBJECT OF THE INVENTION

It is an object of the invention to provide a method and components for fixing of PET panels to a support that allows for recycling of the PET panels, or which ameliorates some of the disadvantages and limitations of the known art or at least provide the public with a useful choice.

SUMMARY OF INVENTION

In general, the invention involves novel products and a novel method of a fixing of needle punched PET products such as panels or baffles to a support to allow for recycling of the needle punched PET product without contamination by a glue.

In a first aspect the invention provides a method of fixing a PET panel to a support in which a PET fixing component is attached to the rear surface of the PET panel by plastic welding, and a complementary fixing component is attached to the support, so that the two complementary components can be attached together.

This can be on the surface of the panel or recessed into the panel. In the latter case it is preferred that the depth of the PET component is less than the thickness of the panel.

This has the advantage that the panel can be connected to the support, and if it is removed from the support by pulling the complementary fixing components apart, the entire PET panel can be recycled together with the PET fixing components welded thereto.

The preferred method of plastic welding is friction/spin welding particularly if the components are to be welded on site. In which case it is preferred that the PET component to be welded to the PET panel is circular in outline.

Preferably the PET fixing component is made from recycled PET panel, so that the recycled material can be used in an injection moulding process to produce the PET fixing component.

Preferably the PET fixing component is designed to be a press fit to the complementary fixing component and more preferably both components can be injection moulded using the recycled PET material.

The invention also applies to PET panels supplied with the PET fixing components pre-welded to the rear face of each panel.

The invention also applies to the recycling/upcycling PET panels having the PET fixing components welded thereto.

Definitions

It is acknowledged that the term ‘comprise□may, under varying jurisdictions, be attributed with either an exclusive or an inclusive meaning. For the purpose of this specification, and unless otherwise noted, the term ‘comprise□shall have an inclusive meaning—i.e. that it will be taken to mean an inclusion of not only the listed components it directly references, but also other non-specified components or elements. This rationale will also be used when the term ‘comprised□for ‘comprising□is used in relation to one or more steps in a method or process.

Mechanical Connection: refers to an adhesive free connection between components, typically as a push fit, or a bayonet or screw fitting so that he components can be connected together or disconnected when needed.

PET refers to polyethylene terephthalate.

"PET fixing component" as used herein refers to a component made of PET (whether virgin PET or recycled PET) which can be attached to a PET panel without the use of an adhesive.

Needle punched PET products refer to those with sufficient stiffness to be suspended or mounted to a wall, ceiling or furniture. They are typically supplied as panels, tiles, suspended baffles, screens, or dividers between workstations.

Needle punched PET Panel-low density—typically from 72-100 kg/m.sup.3

Needle punched PET Panel-medium density—typically from 100-149 kg/m.sup.3

Needle punched PET Panel-high density—typically from 150-400 kg/m.sup.3

Injection moulded PET components typically have a density of about 1370 kg/m.sup.3.

Plastic welding means the joining of two similar plastic components together by heat to allow one or both components to melt and fuse together. Various ways of generating heat can be used including friction or spin welding, ultrasonic welding, lasers, high frequency welding, vibration welding, hot plate welding, hot gas welding, etc.

Friction welding means the joining the two components by the heat generated by friction resulting from the movement of one component relative to the other.

Front face—the visible face of the panel.

Rear face—the face of the panel which is usually hidden as it is to be in contact with a support structure (e.g. an overhead support beam/channel or a vertical wall)

Spin welding is the name for a particular type of friction welding where one component is rotated and pressed against another typically static component.

Ultrasonic welding is the name for a particular type of friction welding where two components are pressed together with ultrasonic vibrations causing one or other of the components to move rapidly relative to, the other.

BRIEF DESCRIPTION OF THE DRAWINGS

The invention will now be described, by way of example only, by reference to the accompanying photographs/drawings:

FIG. 1 shows the PET fixing component (on top) with its spike uppermost (this side is the side to be attached to the PET panel) and also shows the complementary fixing component at the bottom of this figure (this is the component to be secured to a wall).

FIG. 1A shows the opposite faces of both the PET fixing component (on the top) and the complementary fixing component, (below).

FIG. 2 shows the complementary fixing component dis-assembled to show its flexi-core and outer ring.

FIG. 2A shows the opposite faces of the dis-assembled complementary fixing component.

FIGS. 3 to 6 inclusive show a sequence used in an on-site install surface mount method:

FIGS. 7 to 9 inclusive show a sequence used in a factory installed method:

FIG. 9A shows movement of the panel and the welded PET components towards the complementary components fixed to a support.

FIG. 9B shows the panel fixed to the wall by the interlocking of the welded PET component and the complementary component.

Figures 11, 11A, 11B:
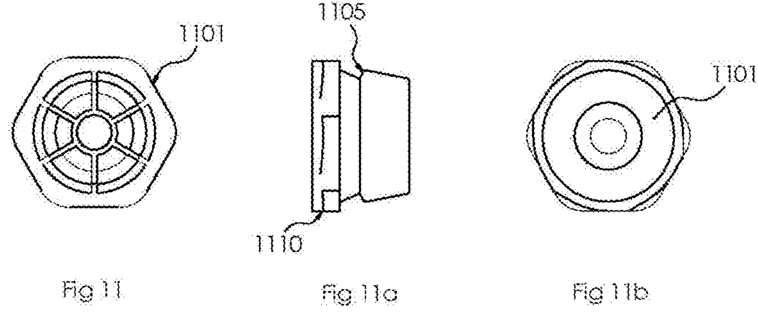
FIG. 11 shows the underside of the channel interface part.
FIG. 11*a* showing a side view of FIG. 11.
FIG. 11*b* showing a top view of the channel interface part of FIG. 11.

The next 4 views shows how the invention can be used to connect a Needle Punched PET baffle from a suspended channel using the channel interface part shown in FIGS. 11, 11*a* and 11*b*.

Figures 5A, 5B, 5C, 5D:
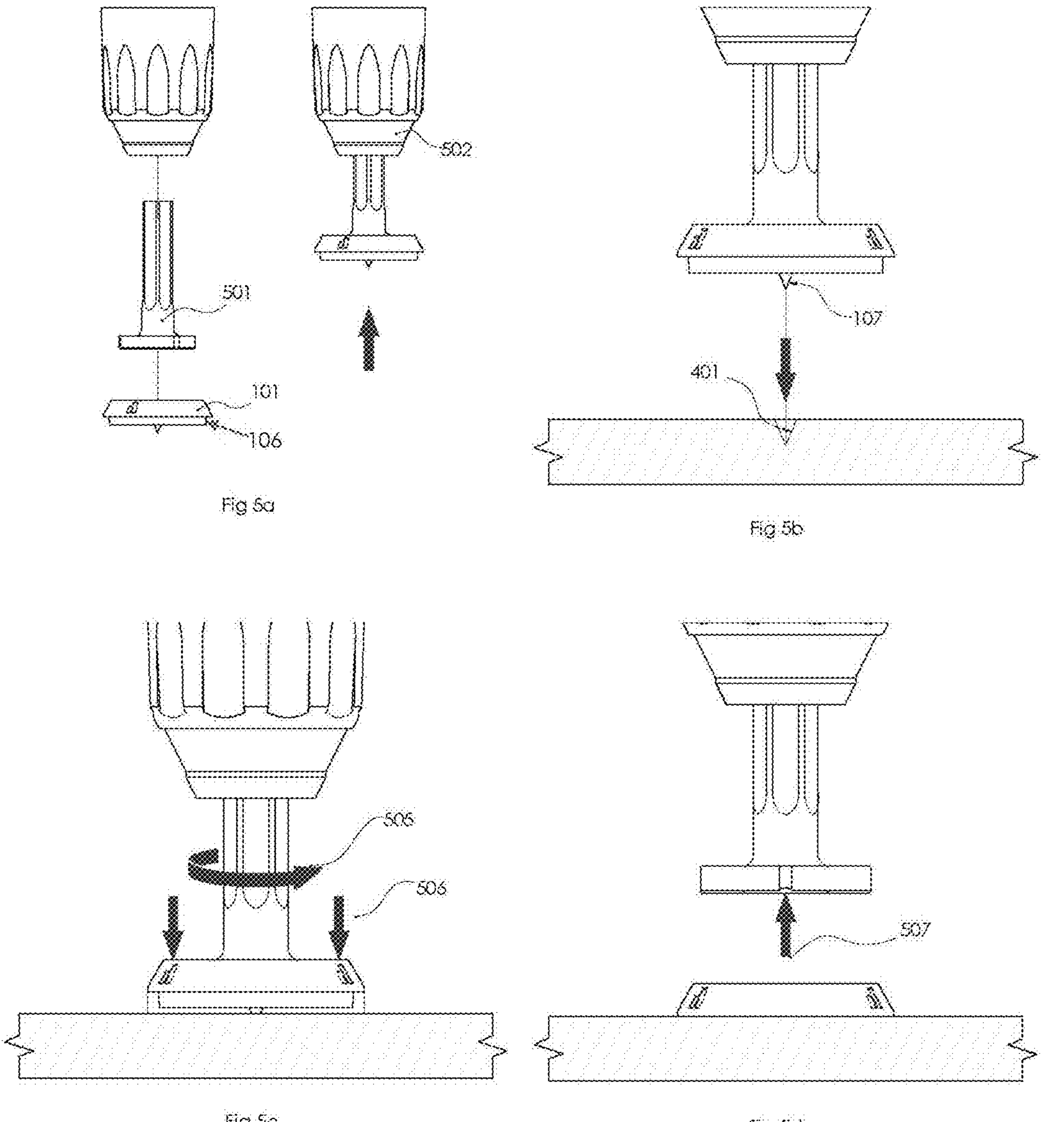
FIG. 5A shows the placement of a PET fastener into a setting tool (with an exploded view on the left and an assembled view on the right)
FIG. 5B shows the drill and setting tool being lowered onto the panel so that the spike of the PET component can be located in the depression (marked as shown in FIG. 4C).
FIG. 5C shows the rotation of the setting tool by the drill and pressure applied to the PET component against the rear face of the PET panel.
FIG. 5D shows disengagement of the setting tool form the now plastic welded PET component.
Figure 13A:
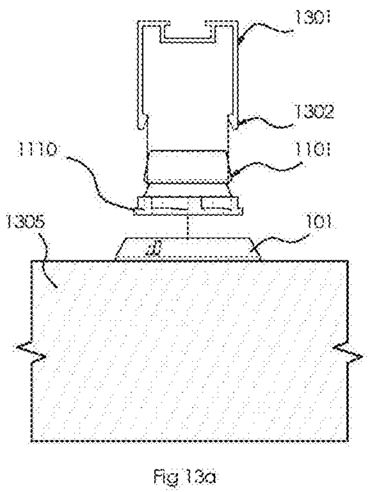

FIG. 13*a* shows a PET component plastic welded to the top surface of the Needle Punched PET baffle in a similar way to FIG. 5*d*, and the channel interface part about to be connected to the PET component.

Figure 13B:
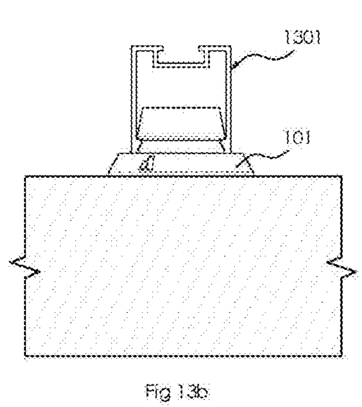

FIG. 13*b* shows the channel interface part connected to the PET component by a bayonet fitting and the channel snap fitted over the channel interface part.

Figures 12A, 12B, 12C, 12D:
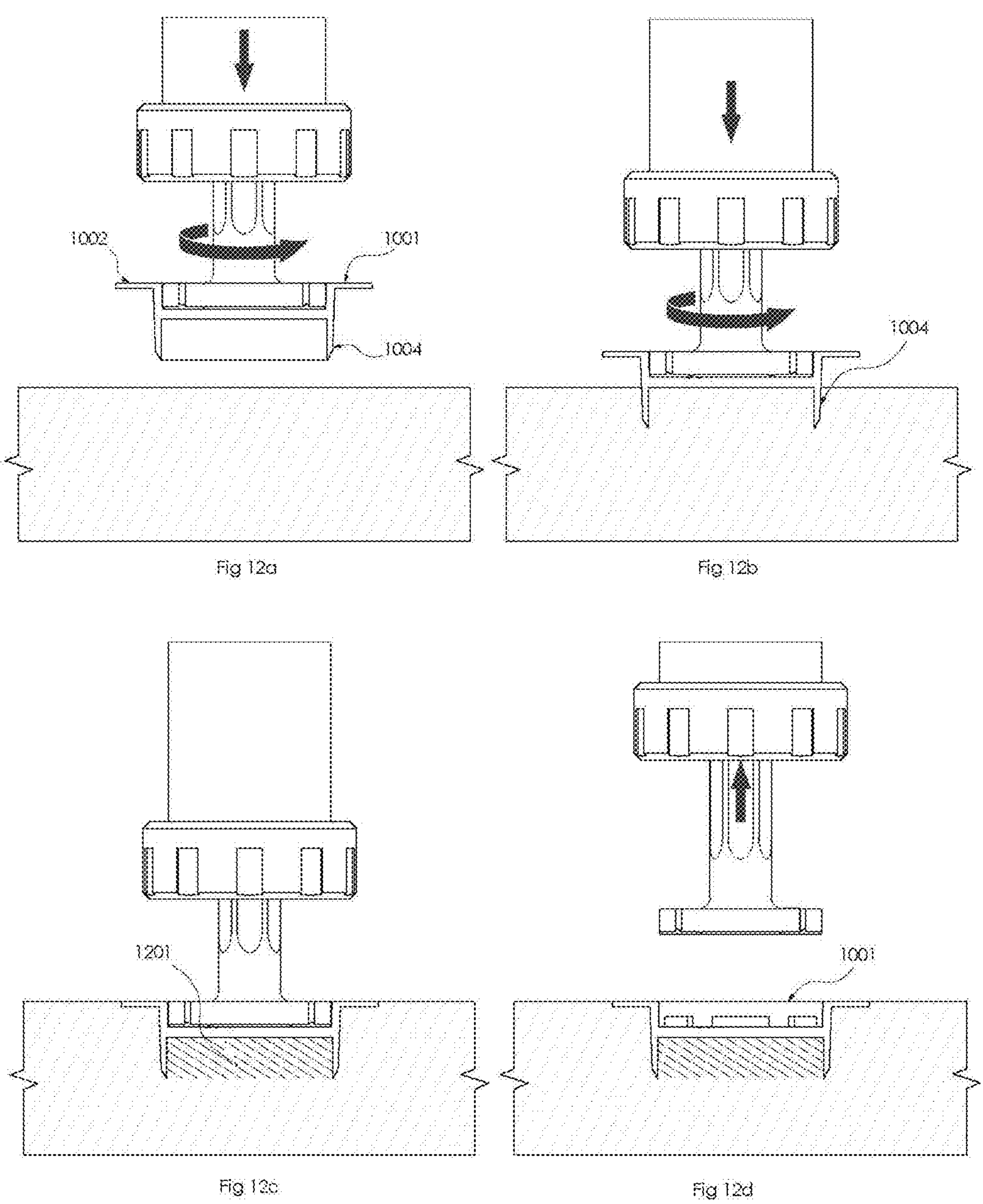
FIG. 12*a* shows the placement of a modified fastener into a setting tool
FIG. 12*b* shows the drill and setting tool being lowered onto the panel so that the outer cutting ring of the modified PET component can cut into the panel.
FIG. 12*c* shows the rotation of the setting tool by the drill and pressure applied to the PET component with the cross hatching representing the melding of part of the needle punched PET panel.
FIG. 12*d* shows disengagement of the setting tool form the now plastic welded PET component which has been sunk into the needle punched PET panel.
Figure 13C:
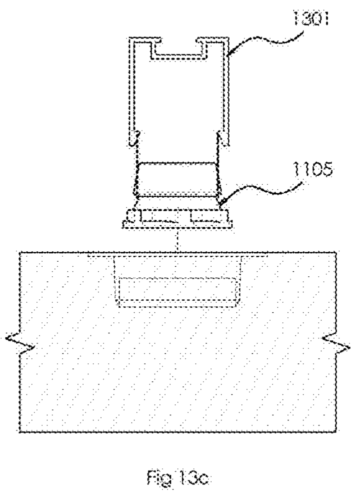

FIG. 13*c* shows a PET component plastic sunk into the top surface of the Needle Punched PET baffle and welded to the interior of the baffle (in a similar way to the welding f the component in FIG. 12*d*, and the channel interface part about to be connected to the PET component.

Figure 13D:
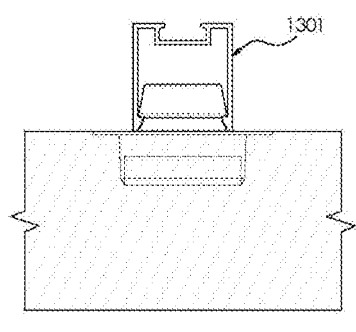

FIG. 13*d* shows the channel interface part connected to the now recessed PET component by a bayonet fitting and the channel snap fitted over the channel interface part.

DESCRIPTION OF THE PREFERRED EMBODIMENT(S)

The following description will describe the invention in relation to preferred embodiments of the invention, namely the fixing of PET panels to allow for recycling The invention is in no way limited to these preferred embodiments as they are purely to exemplify the invention only and that possible variations and modifications would be readily apparent without departing from the scope of the invention.

NUMERALS

101—PET component. 102—complementary component.
103—reverse face of the PET component showing the hexagonal socket 105.
104—generally circular perimeter of the hexagonal socket having a circular outer wall 110.
106—circular ring.
107—central spike.
108—apertures surrounding the hexagonal socket 105.
109—bridging portions.
202—the outer portion of the complementary component.
203—the inner portion of the complementary component.
205—a central aperture in the inner portion.
204—a central aperture in the outer portion of the complementary component.
206—a pentagonal central body of the inner component.
207—a flexible arm of the inner component.
210—a support such as a wall.
301—a fastener such as a screw.
410—a PET panel to be affixed to a support.
411—arrows representing the movement of the PET panel towards the spike 107.
401—The resulting mark or detent in the panel 410.
412—the direction of the panel as it is removed from the spike.
414—an arrow representing the release of the PET component from the complementary component so that it can be used in the next step.
501—a setting tool having a hexagonal end portion capable of fitting into the hexagonal socket 105 at the rear face of the PET component.
502—an electric drill capable of rotating the PET component at high speed
505—an arrow representing the rotation of the setting tool and hence the PET component.
506—arrows representing the force applied to the PET come component as it is pressed against the panel.
507—arrows representing the removal of the setting tool from the now welded PET component.
601—arrows representing the movement of the PET panel towards the complementary component fixed to a substrate.
603—shows an air gap between the PET panel 410 and the support 210.
701—representing a precut recess in a PET panel.
801—representing the movement of a screw 301 towards the complementary component.
901—arrows representing the movement of the PET panel with its welded PET component moving towards the comp entry component fixed to a support.
1001—modified PET component with flange.
1002—flange.
1004—cutting ring.
1101—channel interface part (a modified complementary component).
1105—step.
1110—bayonet fitting.
1201—the area of the needle punched PET underneath the PET component.
1301—suspended channel.
1302—clips.
1305—needle punched PET baffle

Example 1—The Components

FIG. 1 shows the two fixing components. In this case both made from recycled PET. Though the complementary fixing component 102 at the bottom of FIG. 1 (designed to be attached the wall) can be made of any material and need not be the same as the PET component 101. Preferably the complementary fixing component has two parts 202 and 203 that if made from plastic can be injection moulded.

A PET component 101 as shown in FIG. 1 is generally circular in outline and having an upstanding spike 107 extending from one face thereof, so as to be able to mark a PET panel 410 when pressed against it. The reverse face shown at the top of FIG. 1A has a hexagonal recess 105 surrounded by a generally circular perimeter 104.

The central flexi part has a pentagonal body 206 with 5 spring arms 207 extended at a shallow angle from each side. This central part has an aperture 205 for a screw in its centre. The central part is a press fit inside the outer circular ring which also has a central aperture as shown. When the complementary fixing component 202 is fixed to a wall 210 (FIG. 3) then the corresponding PET component can be located over its outer circular ring 209, (temporarily in FIG. 3D, but more permanently in FIGS. 6B and 9B). If the two parts are not perfectly aligned the outer circular ring of the complementary component can move with respect to the fixed pentagonal body. This movement of the outer ring can be up, down or sideways, or at any angle of a clock face, providing a degree of "wiggle room" if the PET and complementary components are not perfectly aligned. This design allows pressure applied to the outer ring to cause one or more of the flexi arms to move inwards.

The complementary component thus provides a self-centring mechanism in the complementary component which is attached to the wall or other support. As shown in the drawings this can be moulded in two pieces, an outer circular component 202 with a large aperture 204 in the centre of the circular component, and an insert component 203 having a plurality of flexible arms 207 extending outwardly from a central body. The central body having a small aperture 205 to receive a screw or other fastener.

In its preferred form the central body is pentagonal in outline so that it has five spring arms extending at a relatively shallow angle from each of the sides, this has the advantage that the outer ring of the complementary component when attached to the wall can then move relative to the screw fastener, if the complementary component is not completely aligned with the corresponding PET fixing component on the back of the panel.

The complementary component when secured to the wall has the ability to allow its outer circular portion to move (up, down or sideways) in the plane of the wall sufficient to accommodate slight misalignment of a corresponding PET fixing component.

The central body is designed to be a snap fit into the outer circular portion, so that to the installer it appears that there are only two components (1) the complementary component to be attached to the wall and (2) the PET fixing component to be attached to the rear of the PET panel.

By way of example the PET fixing component has an outer diameter of 40 mm and an internal diameter of 30 mm. It is approximately 7 mm deep (excluding the spike 107—which protrudes about 3 mm above the circular side wall-just enough to create a detent when pressed into the back of the PET panel). This spike can be used to mark the fixing location on the back of the PET panel.

FIG. 1A shows that the rear face of the PET component has circular outer wall 110 and a generally hexagonal recess. The recess is defined by a hexagonal base and hexagonal sloping walls to provide a snap fit against the smaller diameter outer ring 209 of the complementary component. These sloping walls are designed to provide some degree of flexion as the PET component is pushed over the complementary component. This design assists in allowing the PET component to be temporarily attached to the complementary component fixed to a wall and the spike used to mark the relevant fixing location on the back of the PET panel as shown in FIGS. 4A to 4D. The press fitting needs to be sufficiently secure that it can be used to support the PET panel on the wall but also flexible enough to allow the panel with its plastic welded PET components to be pulled free of the fixed complementary components when the panel and PET components need to be recycled/upcycled.

Example 2—On Site Installation of the Connectors

Figure 3A:
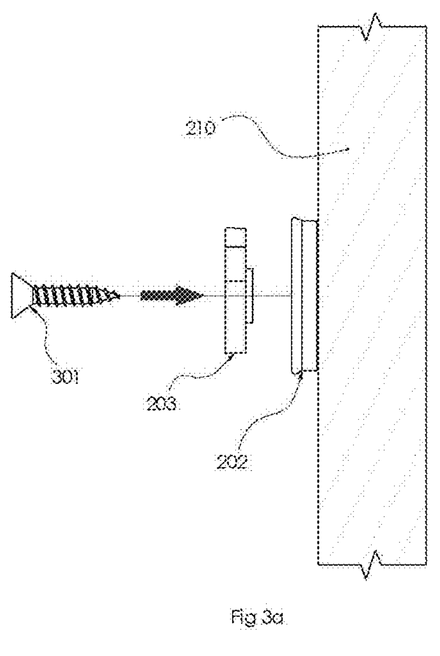
FIG. 3A shows the two parts of the complementary component being screwed to a wall.
Figure 3B:
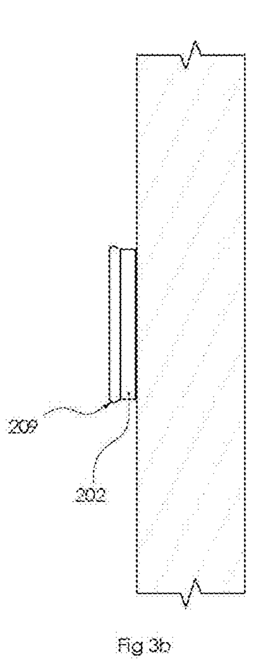
FIG. 3B shows the assembled two part complementary component secured in place.

FIGS. 3 to 6 show the Steps Involved:

Installation typically starts by the complementary components 202 being attached to a wall by screw fasteners 301 as shown in FIG. 3A. For a typical panel we suggest fixing nine such complementary components 202 to the wall in three rows of three. (In the drawings we show only one PET fastener being connected to one complementary fastener but in practice all 9 PET components would be press fitted to the 9 complementary components).

Figure 3C:
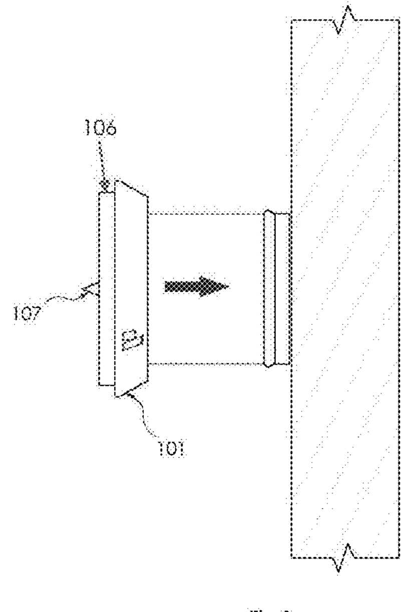
FIG. 3C shows the temporary placement of the PET component being clipped onto the complementary component so that its spike is facing away from the wall.
Figure 3D:
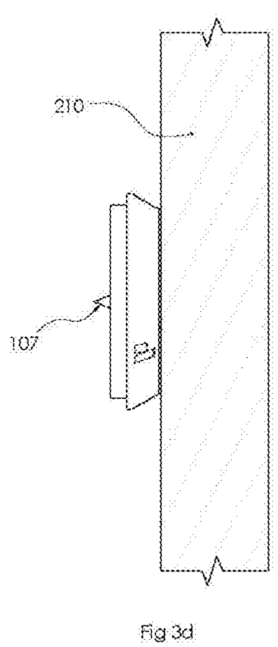
FIG. 3D shows the PET fastener temporarily in place.
Figures 4A, 4B, 4C, 4D:
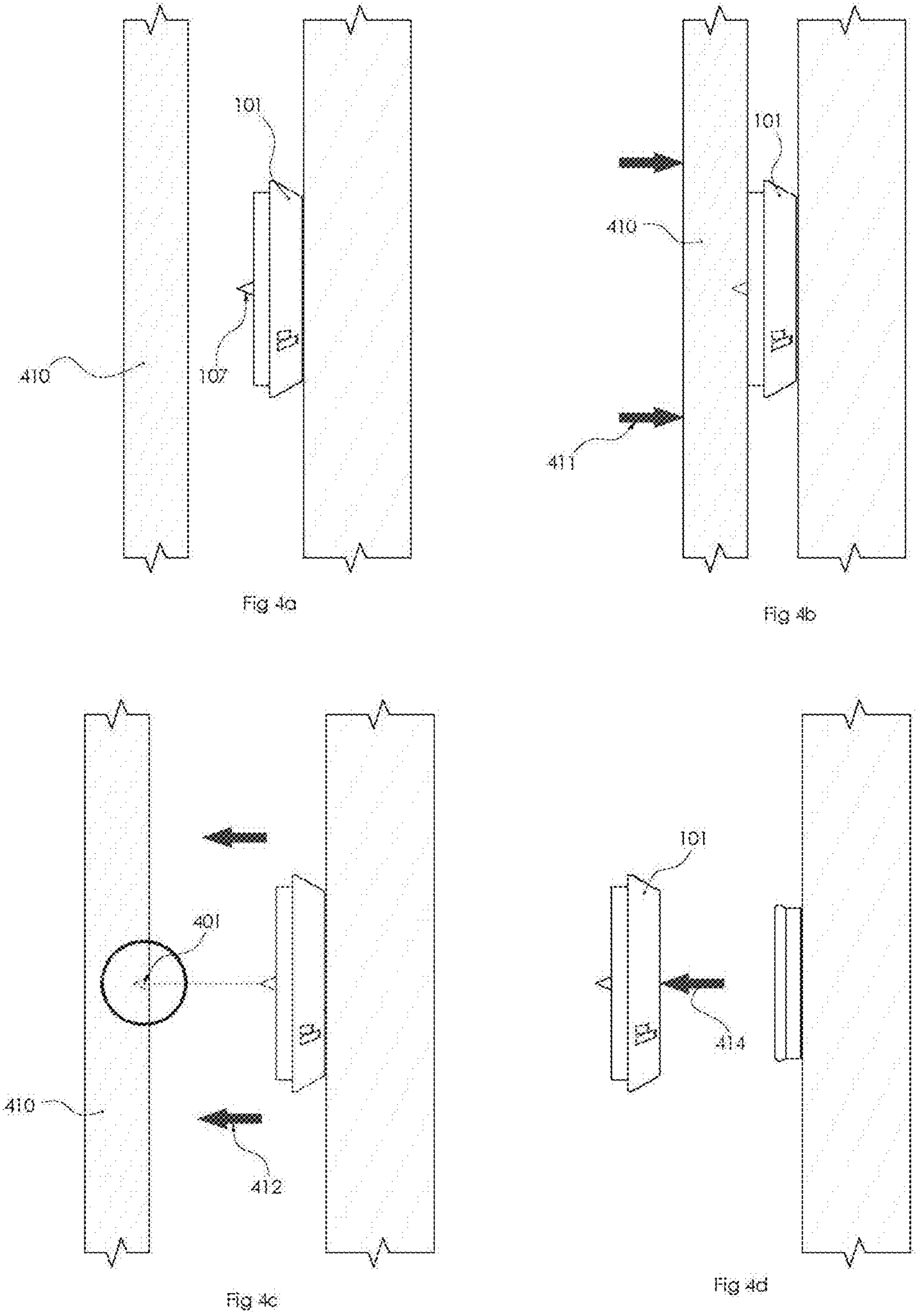
FIG. 4A shows placement of a PET panel in a desired location to be pushed against the wall.
FIG. 4B shows pressure applied to the panel so that it engages the spikes of the fixed complementary fasteners to mark locations on the panel.
FIG. 4C shows the depressions on the panel from the spikes.
FIG. 4D shows removal of the push fit PET fasteners form the complementary fasteners.

The next step is to temporarily push fit the PET fixing component 101 over the top of the corresponding complementary component 202 as shown in FIGS. 3C and 3D, with the spike 107 of the PET component facing outwards as shown in FIG. 4A.

FIG. 4B shows the virgin PET panel 410 being pressed against the complementary fasteners 202 on the wall 210 so that the spikes create indents on the rear surface of the panel to locate the positions 401 of the PET fixing components. The PET fixing components 101 are then removed from the wall and can then be friction welded to the back of the panel at the desired locations 401 indicated by the indents in the panel.

The friction welding step involves the use of the PET fixing components 101 (preferably retrieved from the wall) and placing them in turn in a setting tool 501 held in the chuck of a drill 502 in manner shown in FIG. 5 so that the spike 107 can be located in a relevant detent 401 on the back of the panel. The setting tool has a hexagonal end portion intended to fit into the hexagonal recess on the back of the PET portion. By spinning the PET fixing component at high speed and low pressure—the friction heating between the component and the PET panel causes the panel and the component to be welded together. We have found that for PET panels of different densities the rotational speed provided a hand held electric drill is sufficient to allow plastic welding between the PET component and the PET panel. For example, the rotational speed could be between 100 rpm and 2000 rpm depending upon the load applied on the drill as it is pressed against the panel. The lower the density of the panel the more likely the PET component is to sink into the panel as the fibres in the panel melt.

FIGS. 5A to 5D shows the PET fixing component placed in a setting tool 501 attached to an electric drill to allow it to be friction welded to the rear face of a PET panel. We have found that depending on the speed of the drill 502 only a slight pressure 506 is needed to be applied to the PET fixing component as it is rotated and pressed against the PET panel. As best seen in FIGS. 3C, 5 and 1 the PET component has a circular protruding ring 106 (slightly inboard of the circular perimeter of the PET component 101, which can press into the back of the PET panel and partly melt and/or weld to the rear of the PET panel. It does not matter if it is the PET panel that melts or the PET comment or both, the result is that they can be friction welded together without the need of any adhesive. In addition, these Figures show the central spike which is taller than the protruding ring so that it can be located in the correct position on the panel indicated by the depressions 401 in the panel (see below).

Figures 6A, 6B:
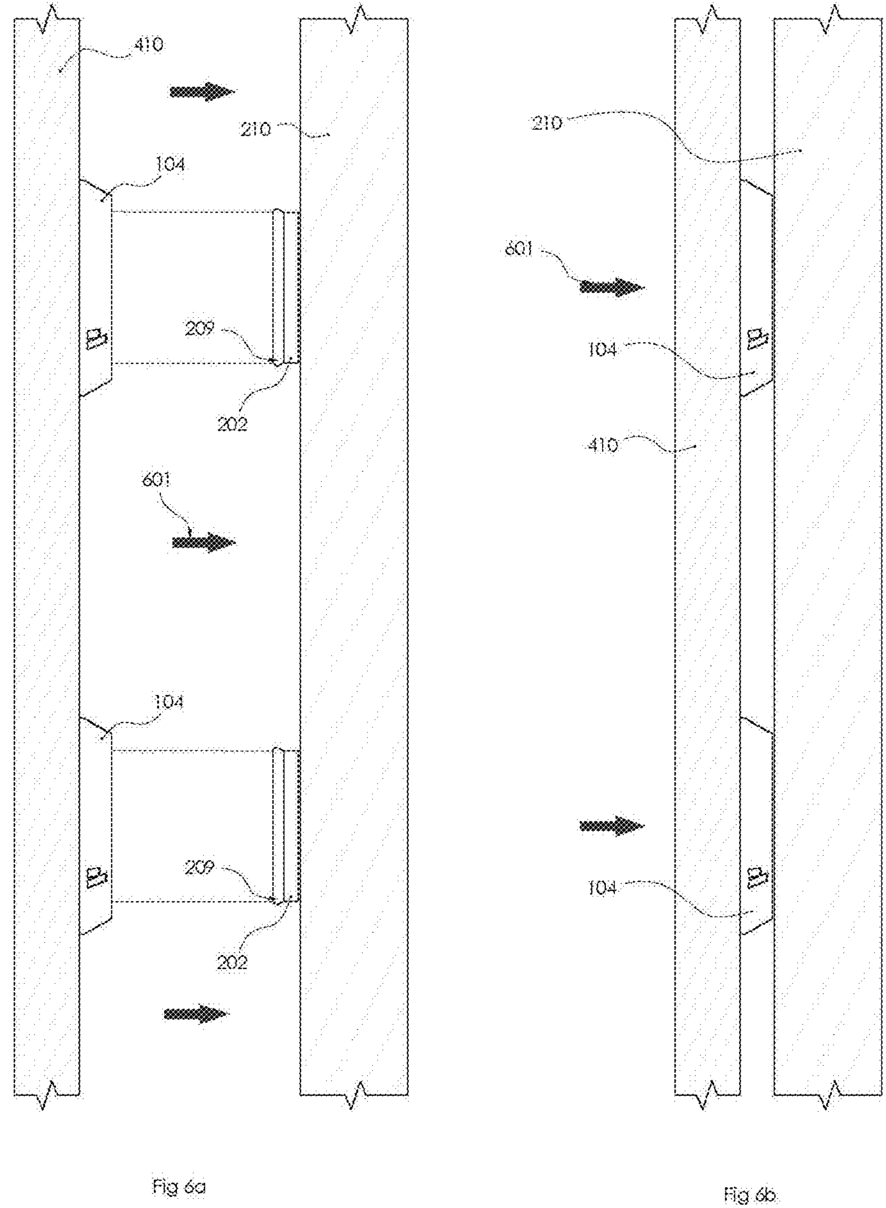
FIG. 6A shows the PET panel with its plastic welded PET components being lined up with the fixed complementary components.
FIG. 6B shows the panel being secured to the wall by the press fitting between the plastic welded PET components and the fixed complementary components.
Figure 9C:
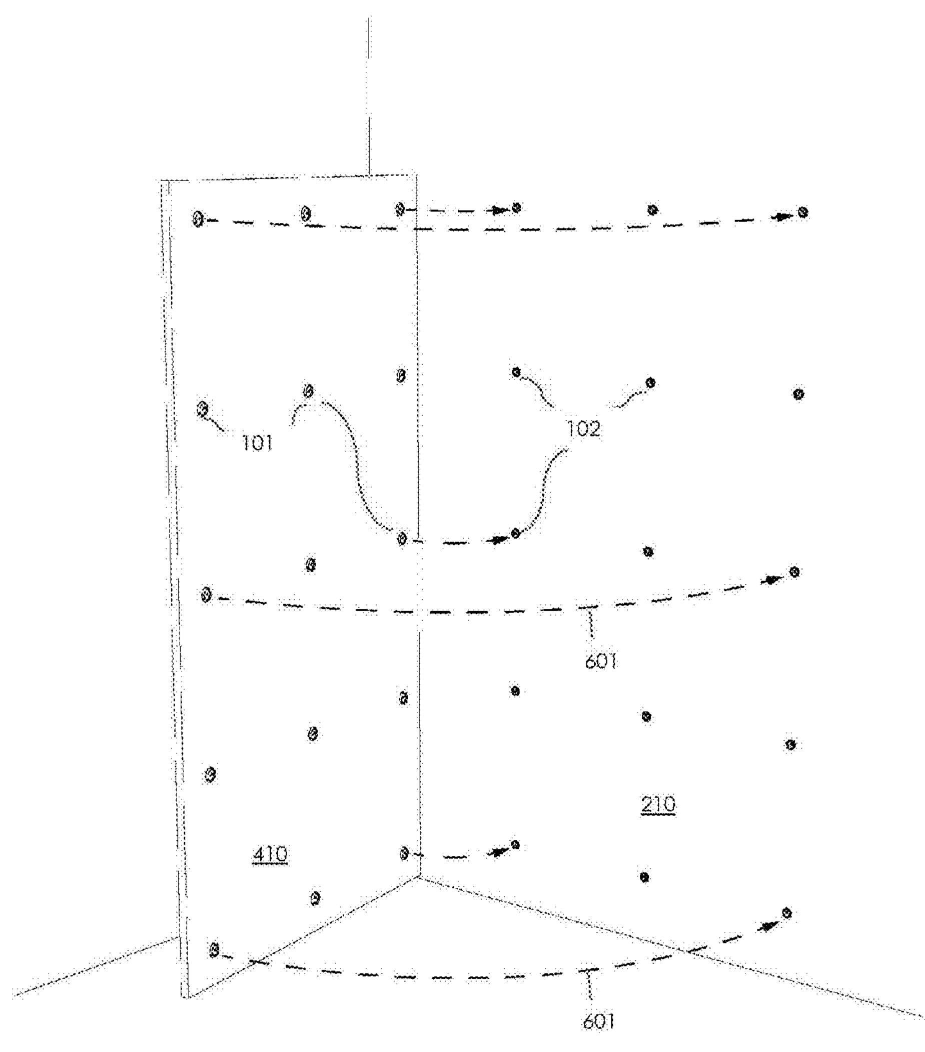
FIG. 9C shows the panel with a plurality of PET components about to be fixed to the wall by the interlocking of the welded PET components and the complementary components.

FIG. 5C shows the electric drill 502 being used to rotate one of the PET fixing components 101 in the direction 505 when it is pressed against the rear surface (seen as the upper surface in FIG. 5C) of a PET panel, the PET component being held by the setting tool and being rotated by the electric drill to friction weld it to the PET panel. FIG. 5*d* shows the removal of the setting tool in direction 507 leaving the PET component welded to the PET patent. A plurality of PET components will be fixed to the panel and a similar number of complementary components will be fixed to the wall. In FIG. 6A two PET components 104 are illustrated on the panel, with the corresponding complementary components being attached to the wall 210. Though depending on the size of the panel it is more likely that between 9 and 15 PRT components will be fixed to the panel. (FIG. 9C shows 15 such PET components spin welded to the panel). In FIG. 6B the panel is pressed against the wall so that the PET components press over and clip to the complementary components so that in the side view only the outermost PET components are visible as they have subsumed the complementary components in their recesses.

FIG. 6A represents three of the typically nine PET fixing components friction welded to the rear face of the PET panel 410 so that the panel can now be placed onto the wall and press fitted to the complementary fixing components 202 shown by the following sequence.

The panel 410 is held close to the wall (FIG. 6A) and then pushed towards the wall 210 (FIG. 6B) so that the PET fixing components 101 on the back of the panel can engage with the complementary components 202 fixed to the wall. A slight tap with heel of the hand is usually enough to lock the components together as shown in FIG. 6B so that the hexagonal socket 105 fits over and now hides the complementary component 102.

As explained above if one or more of the fixed complementary components is not perfectly aligned with the location of the PET components on the back of the panel—then a small amount of adjustment can be accommodated by the movement of the outer ring 202 relative to the pentagonal centre component 203 by pushing against one or more of the flexi arms 207. In this version, the PET panels can be supplied with a number of separate (loose) PET fixing components and complementary fixing components (and if needed, screws) and instructions on how to attach the PET panel to a support using these complementary fixing components as outlined above.

We have tested the friction welding of the PET component to all of the different grades and thicknesses of PET panels we produce and this in-situ method is suitable for all of our grades of PET panel.

Example 3—Air Gap

As shown in FIG. 6B the PET components being mounted on the surface of the rear face of the PET panel allows an air gap 603 to be created between the PET panel 410 and the support 210. This air gap enhances the sound reduction performance of the mounted PET panel.

Example 4—Factory Installed Components

In this arrangement the PET fixing components can be welded to the surface of the PET panels in the factory, so that the PET panels can be supplied to the installer with this step already completed. We prefer to do this using a robotic arm to spin weld the PET fixing component so the PET panel at predetermined locations. This is similar to the previous example except that it omits the marking of the PET panels by the temporary location of the PET components. Instead, the installer can be supplied with a template to mark the spots where holes need to be drilled in a wall to correspond to the location of the PET components. A suitable template could be PET panel with pre-drilled holes corresponding to the location of the PET components.

Alternatively, the installer could be provided with instructions to measure and mark the drilling locations, e.g. by use of a laser or other measuring device.

Example 5—FIGS. 7 to 9 Flush Mounted on Pre-Cut Recesses

Figures 7A, 7B:
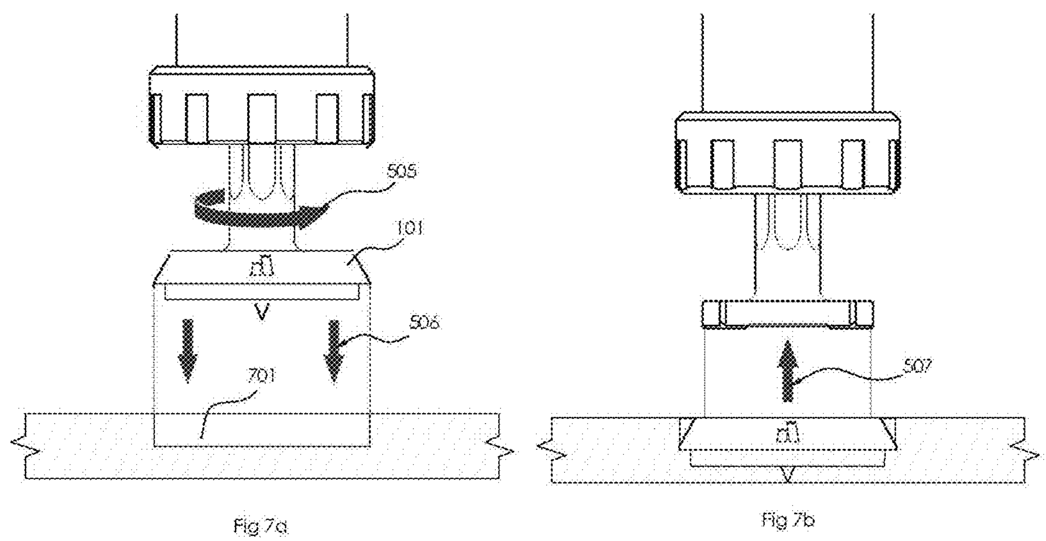
FIG. 7A shows a drill and setting tool locating PET component in a pre-cut recess.
FIG. 7B shows disengagement of the drill and setting tool after the spin welding of the PET component in the recess so that the upper surface is flush with the surface of the panel.
Figure 7C:
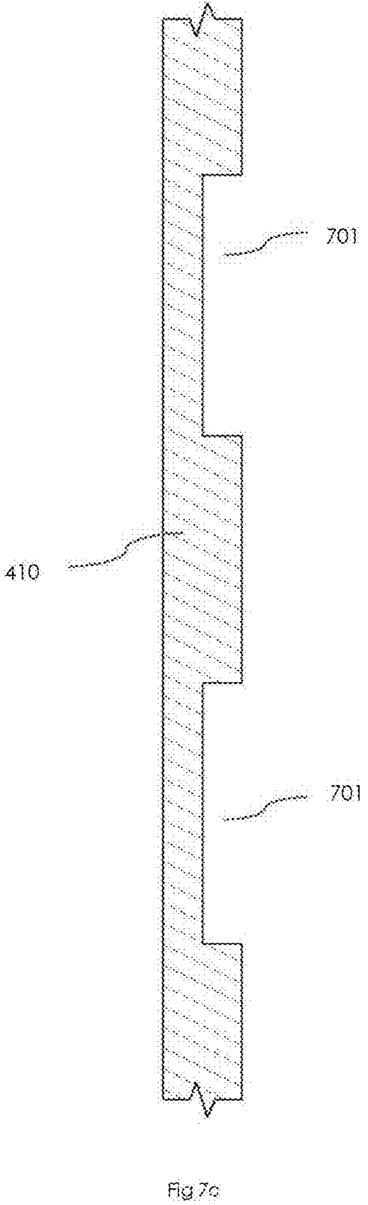
FIG. 7C shows two empty recesses in a the PET panel prior to the insertion and spin welding of the PET components.
Figure 8A:
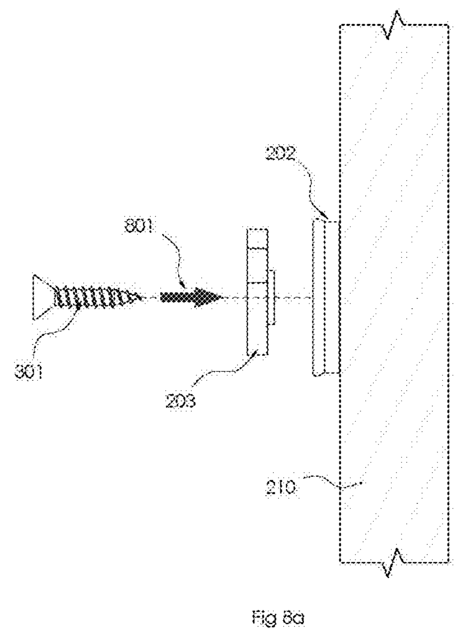
FIG. 8A shows the two parts of the complementary component being screwed to a wall.
Figure 8B:
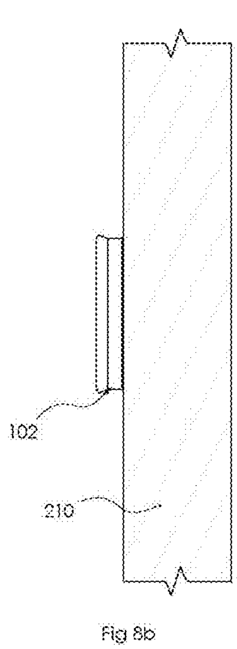
FIG. 8B shows the assembled two part complementary component secured in place.

In an alternative arrangement the PET fixing components can be welded to the PET panels in the factory, so that the PET panels can be supplied to the installer with this step already completed. We prefer to do this using a robotic arm to spin weld the PET fixing component so the PET panel at predetermined locations. In this example the locations can be pre-cut recesses 701 (FIG. 7A). FIG. 7C shows a panel having two pre-formed recesses 701 visible prior to the insertion of the PET components and the operation of spin welding them to the PET panel. The PET fixing components can then be welded to the panel by locating them in the pre-cut recesses 701 as shown in FIGS. 7A and 7B by rotating and applying slight pressure 506. The resulting panels have the PET components flush mounted for ease of stacking and transport as in FIG. 7B (after the tool 501 is removed). The installer can then mark the location of the complementary components and attach them to the support—as described in the previous example. See FIGS. 8*a* and 8*b*. Then press the panel with its flush mounted PET components into the wall mounted complementary components as in FIGS. 9*a* and 9*b*. FIGS. 9A and 9B show a pair of PET components fixed in the recesses by spin welding, and located opposite a pair of complementary components attached to the wall 210. FIG. 9B shows the panel being pressed against the wall so that the PET components cover over and connect to the complementary components as they are now hidden in the recess of each of the PET components 101.

FIG. 9C shows a needle-punched PET panel 410 having five rows of three PET components spin welded to the pre-formed recesses in the panel, and being moved towards a wall in which five rows of three complimentary fittings have been attached so that the PET panel can be securable by a snap fit between the respective components.

However, this means that the panels when mounted to a support will not have an air gap. If an air gap is desired then the complementary components could have higher side walls to ensure the PET panel is held away from the surface of the wall.

Example 6—Flush Mounted without a Pre-Cut Recess

See FIGS. 12*a* to 12*d*.

As mentioned below the heat generated by spin welding allows the PET fixing component to cause the PET fibres in the PET panel to melt so that PET fixing components sink into the PET panel. We have found that it is not necessary to pre-cut a recess as the heat generated by the plastic welding allows for secure welding of the melted fibres of the less dense panel compared to the much denser PET fixing component. Since the plastic welding operation melts the fibres in the plastic it is sometimes necessary to prevent the spinning PET fixing component from sinking too far into the panel. With a robotic arm it is desirable to place a limit on how deep the spinning PET fixing component can sink into the panel.

Figure 10:
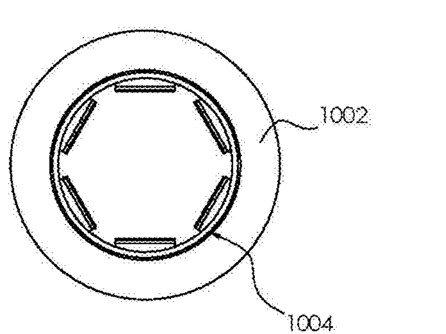
FIG. 10 showing the underside with and without the button and star washer.
Figure 10A:
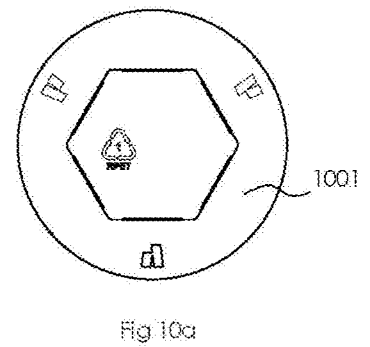
FIG. 10*a* showing the top side with and without the button and star washer.

FIG. 10 shows a modified PET component 1001 having an outer flange 1002 and a cutting ring 1004 to facilitate the entry of the modified PET component into the panel. This is best seen in FIGS. 12 to 12*d* as the cutting ring enters the panel. As the modified PET component enters the panel the portion of the panel direct below the PET component melds with the PET panel to cause it to be friction welded in place.

What the cutting ring 1004 of the self-recessing version 1001 is doing during the insertion is pre-cutting a perimeter cut, allowing the area 1201 under the PET component 1001 to freely compress, as it is no longer connected to the surrounding material, as the PET component 1001 is inserted, the cutting ring 1004 inevitably becomes a friction weld surface as does the underside of the topmost outer flange 1002. This self-recessing version has a larger friction weld surface area than the PET component 101 of FIG. 5*d*.

Because the PET components can be fixed to the back of the set of panels before being sent to the installer there are a number of different ways the installer can locate the positions of the complementary components as mentioned in Example 4 above.

Example 7—Suspended Panels

Bayonet Clip and Stud.

FIGS. 11, 11*a*, and 11*b* show a slightly different complementary component 1101 in the form of a channel interface part. It can be used to connect a needle punched PET baffle 1305 to a suspended channel 1301. In this example the baffle is shown as rectilinear but baffles can be produced in a variety of shapes. Such PET baffles are often used for sound absorption and for decoration as well.

FIGS. 13*a* to 13*d* show the connection sequence for both the externally mounted PET component and the flush mounted PET component.

By using the PET component friction welded to the baffle (as described in the examples above) it is possible to use a channel interface part 1110 which can be mechanically connected to the interior of the PET component. We prefer to use a bayonet fitting to the interior of the PET component so that the channel 1301 can be clipped over the channel interface part 1101 which protrudes from the PET component. Other types of mechanical connections could be used, e.g. a screw threaded connection between the two parts, so long as no adhesive is used.

The channel is typically an extruded aluminium section 1301 suspended by wires from the structure over. It can have internal clips 1302 to clip over the step 1105 formed in the channel interface part 1101.

Example 8—Recycling

When the PET is at the end of its useful life (for whatever reason) it can be easily unclipped from it support or supporting structure and then recycled. To recycle, it can be cut or shredded without the need to remove the PET fixing components as the panel or components are not contaminated by adhesive. It is desirable that the shredded or pelletised output is substantially homogeneous. When it is in small enough pieces it can then be melt and spun into fibres, which can then be inserted into a needle punching line to form a new needle punched panel or fabric. Alternatively, some of the shredded plastic can be used in an injection moulding process to create new injection moulded components such as the PET fixing components described herein.

Advantages

The methods of fixing PET panels to a support as described allows for recycling by using fixing components of the same plastic as that of the PET panel thereby avoiding the need to separate the panel and the fixing components during recycling.

The plastic welding of the PET components and the use of a mechanical connection to the complementary component means that no adhesive is used on the panel so that the panel can lawfully be recycled.

Ease of fixing the complementary component to the wall.

Ease of friction welding the PET fixing components to the panel.

Ability to provide an air gap between the panel and a support.

Variations

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

Whilst spin welding has proved to be the most effective form of plastic welding of PET components to needle punched PET panels, other forms of plastic welding could be used depending upon the density of the panels.

The geometry of the components can be varied—in particular the hexagonal socket 105 could be replaced by other shapes.

The invention claimed is:

1. A method of fixing a needle punched PET product to a support so that the PET product can subsequently be recycled, the PET product having a front face and a rear face, comprising:

attaching at least one first PET fixing component to the rear face of the PET product by plastic welding without use of glue, wherein the least one first PET fixing component has a spike protruding from one face which is pressed into the needle punched PET product to locate the least one first PET fixing component, attaching at least one second complementary mechanical fixing component to a support, attaching the PET product to the support by a mechanical connection between the least one first PET fixing component and the least one second complementary mechanical fixing component so that they are releasably attached together by the mechanical connection without use of glue contaminating the needle punched PET product thereby allowing the PET product and the least one first PET fixing component to be recycled.

2. The method of fixing a needle punched PET product to a support, as claimed in claim 1, wherein the mechanical connection is a push fit connection.

3. The method of fixing a needle punched PET product to a support, as claimed in claim 2, wherein the least one first PET fixing component is attached to the rear face of the PET product by spin welding.

4. The method of fixing a needle punched PET product to a support, as claimed in claim 1, wherein the mechanical connection is a bayonet connection.

5. The method of fixing a needle punched PET product to a support, as claimed in claim 1, wherein the mechanical connection is a screw connection.

6. The method of fixing a needle punched PET product to a support, as claimed in claim 1, wherein the least one second complementary mechanical fixing component is made from PET.

7. The method of fixing a needle punched PET product to a support, as claimed in claim 6, wherein the least one first and second PET fixing components are injection moulded.

8. The method of fixing a needle punched PET product to a support, as claimed in claim 7, wherein the least one first and second PET fixing components are injection moulded with the at least one first fixing component having a circular outer wall surrounding a recess, the recess being designed to receive the least one second fixing component, so that the least one first and second PET fixing components can be press fitted together.

9. The method of fixing a needle punched PET product to a support, as claimed in claim 8, wherein the least one second PET fixing component consists of two parts, an inner body and an outer ring, the outer ring having a central aperture, the inner body having an aperture for a fastener and a plurality of spring arms, the least one second PET fixing component being fixed to the support by the fastener securing the inner body to the support, so that the outer ring can move relative to the inner body in a plane of the support.

10. The method of fixing a needle punched PET product to a support as claimed in claim 9, wherein the support is a wall, and the product is a panel.

11. The method of fixing a needle punched PET product to a support as claimed in claim 10, securing a plurality of the least one second PET fixing components to the wall, so that they are spaced apart from one another, temporarily press fitting the least one first PET fixing component to the at least one second PET fixing component with the spikes on the first PET components facing outwardly, temporarily pressing the needle punched PET panel over the spikes to mark required fixing locations on the panel, removing the panel from the spikes, removing the first PET fixing components from the second fixing components, spin welding the first fixing components to the PET panel by placing each of the first fixing components with its spike in a marked location, and rotating each of the first fixing components so that each one becomes welded to the PET panel, pressing the PET panel over the second fixing components to attach each of the first fixing components to each of the second fixing components.

12. The method of fixing a needle punched PET product to a support as claimed in claim 10, wherein a plurality of the first fixing components have been spin welded to a rear face of a needle punched PET panel, and spaced apart from one another, marking the corresponding locations for the placement of the second fixing components to the support, fixing the plurality of second fixing components to the support, and pressing the PET panel over the second fixing components to attach each of the first fixing components to each of the second fixing components.

13. The method of fixing a needle punched PET product to a support as claimed in claim 10, wherein a plurality of recesses have been formed in the rear face of the needle punched PET panel, and each of the first fixing components has been spin welded in one of those recesses so that the first fixing components do not protrude above the rear face of the needle punched PET panel.

14. The method of fixing a needle punched PET product to a support as claimed in claim 10, wherein each of the at least one first PET fixing components has been spin welded to the rear face of the needle punched PET panel, so that each of the at least one first PET fixing components protrude above the rear surface of the needle punched PET panel to create an air space between the needle punched PET panel and the wall.

15. The method of fixing a needle punched PET product to a support as claimed in claim 1, wherein the support is a suspended channel having a top and side walls and a narrow opening on the underside of the channel formed by inwardly protruding portions, and the product is a baffle.

16. The method of fixing a needle punched PET product to a suspended channel as claimed in claim 15, wherein the at least one first PET component and the at least one second PET fixing component have complementary bayonet fittings.

17. The method of fixing a needle punched PET product to a suspended channel as claimed in claim 16, wherein the second fixing have a channel interface part having a step wider than the narrow opening on the underside of the channel, and the second fixing components are inserted into the channel and restrained by the step engaging the inwardly protruding portions.

* * * * *